United States Patent [19]
Ikeda

[11] Patent Number: 5,805,761
[45] Date of Patent: Sep. 8, 1998

[54] VIDEO RECORD AND REPRODUCE SYSTEM

[75] Inventor: Yasuhisa Ikeda, Chiba, Japan

[73] Assignee: Sony Corporation, Tokyo, Japan

[21] Appl. No.: 690,223

[22] Filed: Jul. 19, 1996

[30] Foreign Application Priority Data

Jul. 21, 1995 [JP] Japan ................................. 7-207779

[51] Int. Cl.⁶ .................................................. H04N 5/92
[52] U.S. Cl. ..................... 386/54; 386/102; 343/307 A; 360/61
[58] Field of Search ........................ 386/1, 4, 35, 39, 386/52, 53, 54, 96–106, 92; 360/13, 61, 64; 348/705, 706, 738; 434/307 A, 308; 381/119, 61

[56] References Cited

U.S. PATENT DOCUMENTS

| | | | |
|---|---|---|---|
| 4,275,268 | 6/1981 | Takahashi et al. ...................... | 381/119 |
| 4,524,452 | 6/1985 | Marshak ................................... | 381/119 |
| 5,194,963 | 3/1993 | Dunlap et al. ........................... | 386/39 |
| 5,477,003 | 12/1995 | Muraki et al. ....................... | 434/307 A |
| 5,494,443 | 2/1996 | Nakai et al. ......................... | 434/307 A |
| 5,506,690 | 4/1996 | Kim ......................................... | 386/106 |

*Primary Examiner*—Andrew I. Faile
*Assistant Examiner*—Luong Nguyen
*Attorney, Agent, or Firm*—Frommer Lawrence & Haug LLP; William S. Frommer

[57] ABSTRACT

The system is in form of a double-deck video cassette recorder incorporating a video/audio reproducer and a video/audio recorder/reproducer. Reproduced video signal output from the video/audio reproducer is coupled to the video/audio recorder/reproducer via a selector. The video/audio recorder/reproducer is coupled to an externally introduced video signal through a video selector and connected to a mixer that combines reproduced audio signal output with an externally introduced audio signal. In response to reproduction or interruption of the reproduction of the video/audio reproducer, the video/audio recorder/reproducer is activated through a control line to record signals or interrupt it.

6 Claims, 3 Drawing Sheets

VIDEO RECORD AND REPRODUCE SYSTEM

BACKGROUND OF THE INVENTION

1. Field of the Invention

This invention relates to an image record and reproduce system for recording an image of a singer and a combined audio signal which is, for example, a mixture of an audio signal reproduced by an accompaniment music reproducer called "Karaoke" player and a voice of the singer who sings with the accompaniment.

2. Description of the Related Art

The "Karaoke" pertains to singing with an orchestral accompaniment reproduced from a recording medium by a "Karaoke" player, and it is worldwide enjoyed today. There is a technique for recording on a cassette tape the voice of a "Karaoke" singer in combination with a reproduced audio signal of instrumental accompaniment music, background chorus, and so on. However, there is no integral type system that can records both mixed audio signals combining a reproduced accompaniment and singer's voice and video signals of singer's images.

For recording both mixed audio signals combining accompaniment music and singer's voice and video signals of singer's images on a common video cassette tape, a conventional technique uses a video camera integral with a VTR in addition to a "Karaoke" player such that a built-in microphone of the integral VTR/camera collects the singer's voice in form of audio signals output from speakers of the "Karaoke" player and the integral VTR/camera records the singer's images. A problem with this method is a bad quality of recorded audio signals.

Another method connects a video reproducer, video camera, audio mixer and video recorder are connected. Problems with this method are that the video reproducer, video camera, audio mixer and video recorder, which should synchronize with each other in record and reproduce operations, must be of the same control system and that connection of these components by both control lines and signal lines takes time and labor.

Japanese Patent Laid-Open 4-501345 (1992) teaches the use of a double-deck video cassette recorder, in which original reproduced audio signals reproduced by the video reproducer are output from a terminal and combined with external singer's audio signals by an external audio mixer combines external singer's audio signals with audio signals reproduced by the video reproducer. The combined audio signals are then input into and recorded by the video recorder. A problem with the prior art is that it still needs substantially the same troublesome connection as required when using two separate video cassette decks.

OBJECT AND SUMMARY OF THE INVENTION

It is therefore an object of the invention to provide a video record and reproduce system that makes it easy to record both mixed audio signals combining original reproduced audio signals and singer's audio signals and video signals of singer's images.

According to the invention, there is provided a video recording and reproducing system incorporating a reproducing apparatus for reproducing video signals and audio signals and a recording apparatus for recording video signals and audio signals, comprising:

video selector means connected between a video output of the reproducing apparatus and a video input of the recording apparatus for selectively supplying one of the video signal from the video output of the reproducer or an externally introduced video signal to the video input of the recording apparatus;

audio mixer means for combining the audio signal reproduced by the reproducing apparatus with an externally introduced audio signal; and audio selector means connected between an audio output of the reproducing apparatus and an audio input of the recording apparatus for selectively supplying one of the audio signal from the audio output of the reproducer or an audio signal from the audio mixer means to the audio input of the recording apparatus.

The system is in form of a double-deck video cassette recorder incorporating the video/audio reproducing apparatus and the video/audio record/reproduce apparatus. The reproduced video signal output from the video/audio reproducing apparatus is coupled to the video/audio record/reproduce apparatus via the video switching means. The video/audio record/reproduce apparatus also receives the externally input video signal via the video switching means. The video/audio record/reproduce apparatus is coupled with the mixer means for mixing the reproduced audio signal output and the input audio signal. Thus, the video/audio record/reproduce apparatus is controlled through the control line to effect or interrupt its recording operation in response to reproduction and interruption of the video/audio reproducing apparatus.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
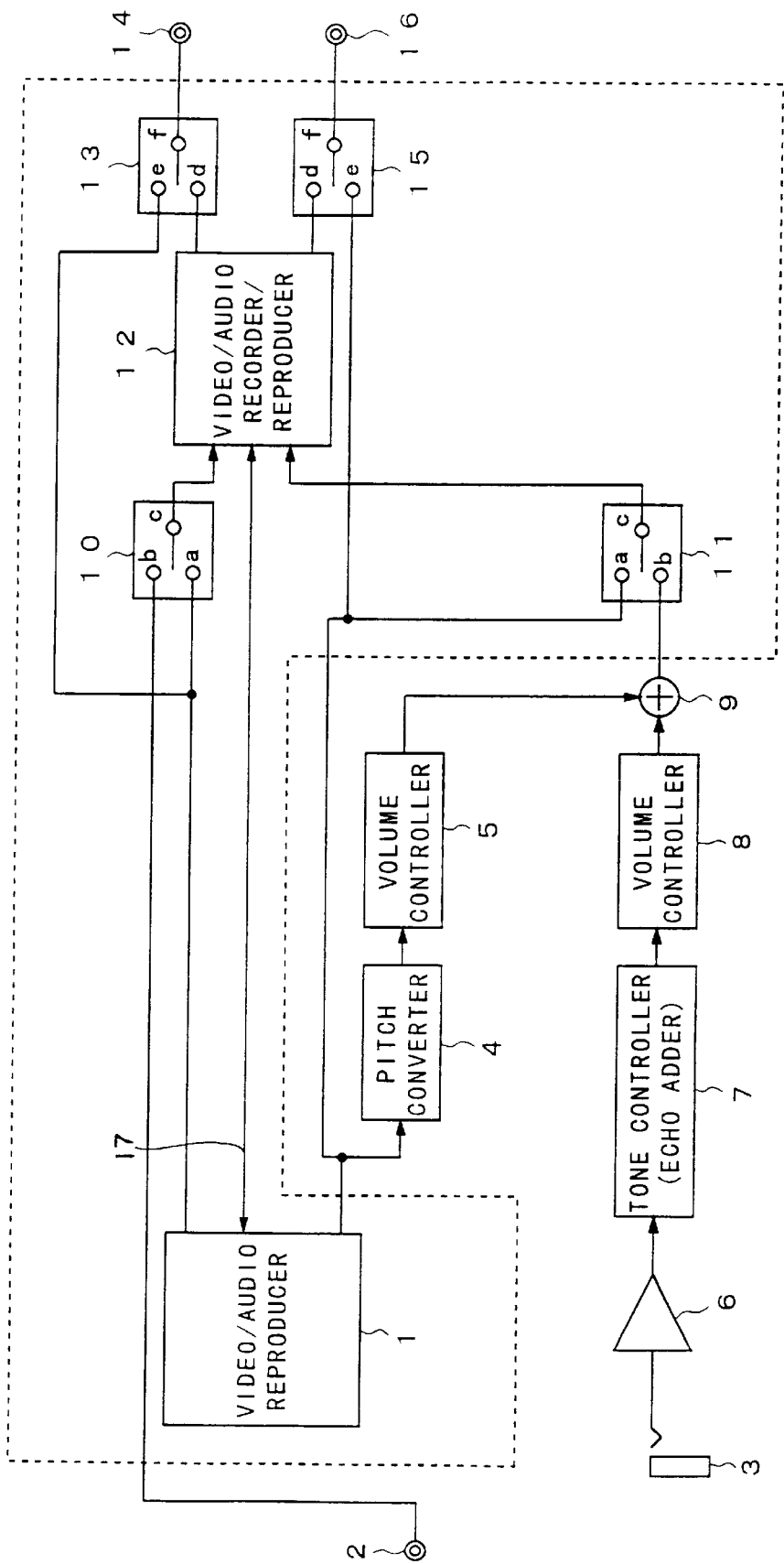
FIG. 1 is a block diagram showing the construction of a video record and reproduce system according to an embodiment of the invention.

Embodiments of the invention are explained below. FIG. 1 shows a video record and reproduce system embodying the invention. The system of FIG. 1 is in form of a double-deck video cassette recorder incorporating a video/audio reproducer and a video/audio recorder/reproducer. By incorporating the video/audio reproducer and the video/audio recorder/reproducer, a single system controller can control all, and a signal for synchronization such as servo reference signal supplied through control lines can be commonly used for all.

In FIG. 1, numeral 1 denotes a rotary head type video cassette recorder, for example, which is a video/audio reproducer configured for reproduction of cassette tapes. Numeral 12 denotes a video/audio recorder/reproducer configured for recording and reproduction of cassette tapes. The video/audio reproducer 1 and the video/audio recorder/reproducer 12 are connected by a control line 17. A video signal from a video camera, for example, is supplied to an input terminal b of a selector 10 through a video external input terminal 2.

Supplied to an input terminal a of the selector 10 is a reproduced video signal output from the video/audio reproducer 1. Connected between the input terminal a and the video/audio reproducer 1 is an input terminal e of a selector 13.

Au audio signal from a microphone, for example, is supplied to an audio external input terminal 3 and then sent through an amplifier 6, tone controller (reverb adder) 7, and volume controller 8 to a mixer 9. A reproduced audio signal output from the video/audio reproducer 1 is supplied to an input terminal a of a selector 11 and to an input terminal e of a selector 15, and also to the mixer 9 through a pitch converter 4 and a volume controller 5.

An output signal from an output terminal c of the selector 11 is supplied to the video/audio recorder/reproducer 12 which also receives an output signal from the output terminal c of the selector 10. Reproduced video signal output from the video/audio recorder/reproducer 12 is supplied to another input terminal d of the selector 13. Reproduced audio signal output from the video/audio recorder/reproducer 12 is supplied to another input terminal d of the selector 15. The output signal through the selector 13 is delivered to a video output terminal 14 from the output terminal f. The audio signal through the selector 15 is delivered to an audio output terminal 16 from the output terminal f. The video output terminal 14 and the audio output terminal 16 are coupled to a monitor having a built-in speaker or a separate speaker connected to it.

In response to reproducing operation or interruption of the reproducing operation by the video/audio reproducer 1, the video/audio recorder/reproducer 12, the video/audio recorder/reproducer 12 is controlled via the control line 17 to execute or interrupt the recording operation.

The circuit elements blocked in the broken line of FIG. 1, namely, the video/audio reproducer 1, selectors 10, 11 for switching between the external input and the output of the video/audio reproducer 1, video/audio recorder/reproducer 12, output selectors 13 and 15, are integrally incorporated within a common housing, like those in the prior art double-deck video cassette recorder referred to above. By connecting input terminals a and output terminals c in the selectors 10, 11, reproduced video signal output and reproduced audio signal output from the video/audio reproducer 1 can readily be dubbed in the video/audio recorder/reproducer 12. In contrast, it was very difficult for the prior art system to selectively insert the externally entered video signal in the reproduced video signal output, to combine the reproduced signal output with the externally entered audio signal and to add the process for controlling the volume and the tone of sound.

Explained below is a process of behaviors of the video record and reproduce system according to the first embodiment. An audio signal for a "Karaoke" singer's voice introduced through the external audio input terminal 3 is amplified into an appropriate signal level by an amplifier 6. The amplified audio signal is subjected to desired additional processing in the tone controller (reverb adder) 7, such as treble and bass adjustment and addition of reverb or echo, and then delivered to the volume controller 8 such that the level of the audio signal can be adjusted. Reproduced audio signal output of the video/audio reproducer 1 is supplied to the pitch converter 4. If the input audio signal from the external audio input terminal 3 is a "Karaoke" song from the microphone, the pitch converter 4 changes the pitch of the reproduced audio signal output into harmonization with the song (normally in chromatic intervals).

The volume controller 5 adjusts the volume of the reproduced audio signal output and delivers it to the mixer 9. The mixer 9 combines the output signal from the volume controller 5 and the output signal from the volume controller 8. The combined output signal from the mixer 9 is sent to the video/audio recorder/reproducer 12 through the terminals b–c of the selector 11 and recorded there. In this manner, the system can mix the reproduced audio signal output and an externally input audio signal adjusted in pitch, echo and volume as the singer desires, and can record the mixed audio signal in the video/audio recorder/reproducer 12.

The mixed audio signal can be output also to the audio output terminal 16 through the terminals d–f of the selector 15 simultaneously with the recording. By controlling the selector 10 to change its input terminal from a to b during dubbing from the video/audio reproducer 1 to the video/audio recorder/reproducer 12, the externally input video signal can be recorded in the video/audio recorder/reproducer 12. If the selector 10 is a circuit capable of wiping, overlapping, fading and/or other image processing, more effective changeover of images can be expected.

Figure 2A:
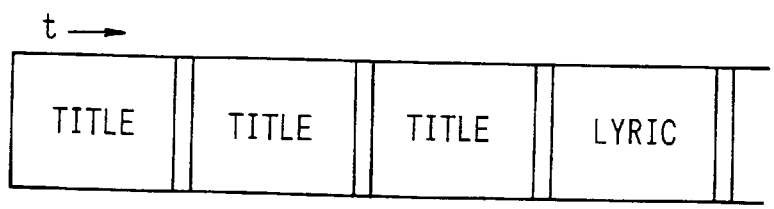
FIGS. 2A through 2C is a schematic diagram showing an automatic switching control process by the embodiment of the invention.
Figure 2B:
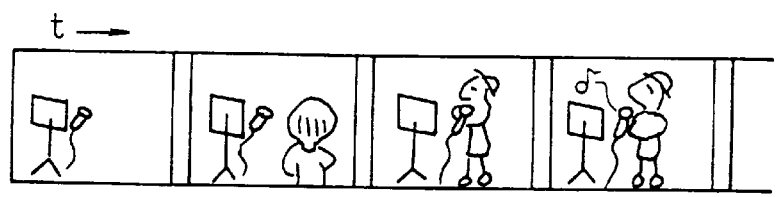
Figure 2C:
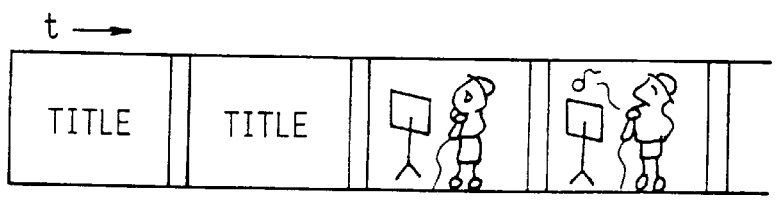

FIGS. 2A through 2C show a process of automatic changeover control using the embodiment of the invention. FIG. 2A shows a reproduced image reproduced by the video/audio reproducer. FIG. 2B shows an image of a singer taken by the video camera. As one example of image changeover control, the video/audio recorder/reproducer 12 starts recording in synchronism with the start of reproduction of the video/audio reproducer 1, with terminals a–c of the selector being connected, so that the reproduced video signal output of the video/audio reproducer 1 is recorded in the video/audio recorder/reproducer 12. Seconds later, terminals b–c of the selector 10 are connected so that an externally input video signal is recorded in the video/audio recorder/reproducer 12.

By automatic changeover control in this manner, after an image of a title of music as shown in FIG. 2A, for example, when used for recording a "Karaoke" scene, images of the singer shown in FIG. 2B can be recorded to obtain more effective recording as shown in FIG. 2C. The signals recorded on the tape are reproduced by the video/audio recorder/reproducer 12, and supplied via the video output terminal 14 and audio output terminal 16 as images on the display and sounds from the speakers.

Figure 3:
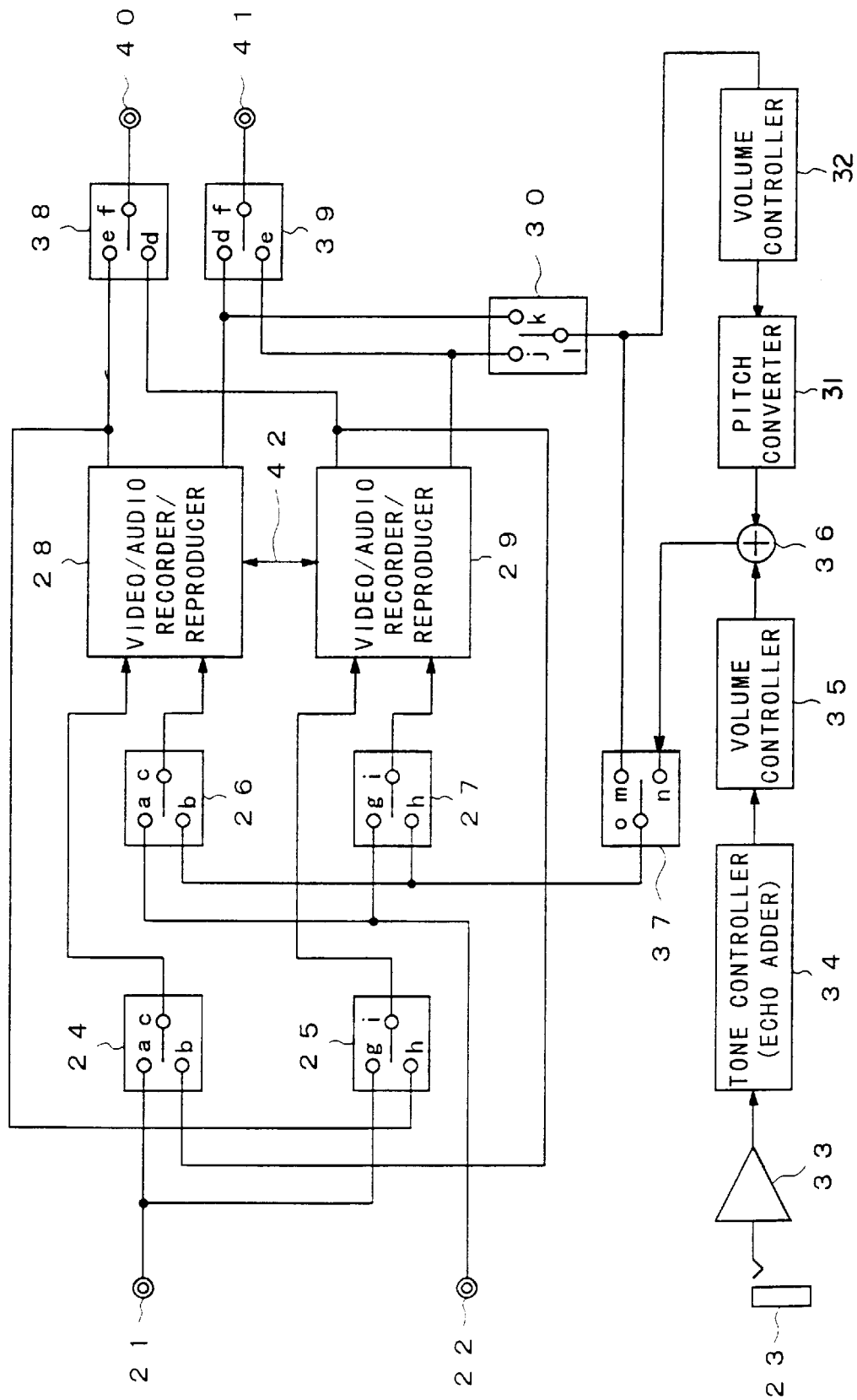
FIG. 3 is a block diagram showing the construction of a video record and reproduce system according to another embodiment of the invention.

FIG. 3 shows a video record and reproduce system according to another embodiment of the invention. The embodiment of FIG. 3 is different from the former embodiment in that the system is a double-deck video cassette recorder in which both apparatuses are video/audio recorder/reproducers. In FIG. 3, numerals 28 and 29 denote video/audio recorder/reproducers which are connected by a control line 42. An input video signal introduced through an external video input terminal 21 from a video camera, or the like, is supplied to both an input terminal a of a selector 24 and an input terminal g of a selector 25.

The other input terminal b of the selector 24 receives a reproduced video signal output from the video/audio recorder/reproducer 29. Connected between the input terminal b and the video/audio recorder/reproducer 29 is an input terminal d of a selector 38. The output signal from the output terminal c of the selector 24 enters in the video/audio recorder/reproducer 28. The other input terminal h of the selector 25 receives a reproduced video signal output from the video/audio recorder/reproducer 28. Connected between the input terminal h and the video/audio recorder/reproducer 28 is the another input terminal e of the selector 38. The output signal from the output terminal i of the selector 25 is supplied to the video/audio recorder/reproducer 29.

An external audio signal introduced from an external audio input terminal 22 is supplied to both an input terminal a of a selector 26 and an input terminal g of a selector 27. An external audio signal is introduced via a microphone, or the like, to an external audio input terminal 23. The external audio signal from the input terminal 23 is supplied to a mixer 36 via an amplifier 33, tone controller (echo adder) 34, and volume controller 35. The mixer 36 also receives an output signal from an output terminal 1 of a selector 30 via a pitch converter 31 and a volume controller 32. Connected between the output terminal 1 and the pitch converter 31 is an input terminal m of a selector 37. Supplied to the other input terminal n of the selector 37 is the output signal from the mixer 36.

The output signal from the output terminal o of the selector 37 is supplied to both the input terminal h of the selector 27 and the input terminal b of the selector 26. The output signal from the output terminal c of the selector 26 is supplied to the video/audio recorder/reproducer 28. The output signal from the output terminal i of the selector 27 is supplied to the video/audio recorder/reproducer 29. The reproduced audio signal output of the video/audio recorder/reproducer 28 is supplied to both an input terminal d of a selector 39 and the other input terminal k of the selector 30. The reproduced audio signal output of the video/audio recorder/reproducer 29 is supplied to both the other input terminal e of the selector 39 and the other input terminal j of the selector 30. The output signal of the output terminal f of the selector 38 is delivered to a video output terminal 40, and the output signal of the output terminal f of the selector 39 is delivered to an audio output terminal 41. The video output terminal 40 and the audio output terminal 41 are connected to a monitor (not shown).

Next explained are behaviors of the embodiment of FIG. 1. This invention is basically the same as the embodiment of FIG. 1 except that the number of selectors is twice as compared with the first embodiment because two video/audio recorder/reproducers 28 and 29 need individual selectors for changing inputs. When the selector 24, as an input for the video/audio recorder/reproducer 28, connects its terminals a–c, the video/audio recorder/reproducer 28 records the externally introduced video signal. When the selector 24 connects its terminals b–c, the video/audio recorder/reproducer 28 records the reproduced audio signal output from the video/audio recorder/reproducer 29.

When the selector 25, as an input for the video/audio recorder/reproducer 29, connects its terminals g–i, the video/audio recorder/reproducer 29 records the externally introduced video signal. When the selector 25 connects its terminals h–i, the video/audio recorder/reproducer 29 records the reproduced audio signal output from the video/audio recorder/reproducer 28. The selector 30 connects its terminals k–l to select the reproduced audio signal output of the video/audio recorder/reproducer 28, and connects its terminals j–l to select the reproduced audio signal output of the video/audio recorder/reproducer 29.

When the selector 37 connects its terminals m–o (during normal dubbing), one of the reproduced audio signal output of the video/audio recorder/reproducer 28 or the reproduced audio signal output of the video/audio recorder/reproducer 29 selected by the selector 30 is delivered to both the input terminal b of the selector 26 and the input terminal h of the selector 27. When the selector 37 connects its terminals n–o, the mixed audio signal mixing the externally introduced audio signal and the reproduced audio signal output selected by the selector 30 is delivered to both the input terminal b of the selector 26 and the input terminal h of the selector 27.

When the selector 26 connects its terminals a–c, the externally introduced audio signal can be recorded in the video/audio recorder/reproducer 28. When the selector 26 connects is terminals b–c, the output signal selected by the selectors 30 and 37 can be recorded in the video/audio recorder/reproducer 28. The selector 27 connects its terminals g–i for the video/audio recorder/reproducer 29 to record the externally introduced audio signal, and connects its terminals h–i for the video/audio recorder/reproducer 29 to record the output signal selected by the selectors 30 and 37.

By these selecting operations of the selectors, the system can operate both as a conventional double-deck video cassette recorder and as a particular system for recording both a mixed audio signal mixing an originally reproduced audio signal from a "Karaoke" player and a singer's audio signal and a video signal of a singer's image. If the selectors are circuits available for wiping, overlapping, fading and/or other image processing, more effective switching of images is promised. The selectors 24 and 25 may of course be automatically controlled, as explained with FIGS. 2A through 2C, for more effective recording. The signals recorded on the tape, as explained above, are reproduced by the video/audio recorder/reproducer 28 or 29, and supplied via the video output terminal 14 and audio output terminal 16 as images on the display and sounds from the speakers.

The video/audio reproducer 1 and video/audio recorder/reproducers 12, 28, 29 should be widely construed to involve not only VTRs (VHS, β, 8 mm and like others) but also disk-type video reproducers (LD, CD video players, DVD and like others) and any future disk-recording media.

In summary, the video recording and reproducing system according to the invention can readily record both a mixed sound mixing an originally reproduced sound from a "Karaoke" player and a singer's voice, and an image of the singer. By additionally using automatic switching control of images, more effective recording is promised.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A video recording and reproducing system incorporating a reproducing apparatus for reproducing video signals and audio signals and a recording apparatus for recording video signals and audio signals, comprising:

video selector means connected between a video output of said reproducing apparatus and a video input of said recording apparatus for selectively supplying one of the video signal from said video output of said reproducing apparatus or an externally introduced video signal to said video input of said recording apparatus;

audio mixer means for mixing the audio signal reproduced by said reproducing apparatus and an externally introduced audio signal; and audio selector means connected between an audio output of said reproducing apparatus and an audio input of said recording apparatus for selectively supplying one of the audio signal from said audio output of said reproducing apparatus or an audio signal from said audio mixer means to said audio input of said recording apparatus.

2. The video recording and reproducing system according to claim 1, wherein said audio mixer means comprises:

first volume control means for adjusting the audio output of said reproducing apparatus to a desired signal level;

second volume control means for adjusting the externally introduced audio signal to a desired signal level; and adder means for adding outputs of said first and second volume control means.

3. The video recording and reproducing system according to claim 1, wherein said audio mixer means includes pitch converter means for varying the pitch of the audio output of said reproducing apparatus.

4. The video recording and reproducing system according to claim 1, wherein said audio mixer means includes tone control means for adjusting the tone of the externally introduced audio signal.

5. The video recording and reproducing system according to claim 1, wherein said video selector means can selectively switch the video output of said reproducing apparatus to or from the externally introduced video signal by overlapping, wiping, facing or other image processing.

6. The video recording and reproducing system according to claim 1, wherein said video selector means is controlled to automatically select the externally introduced video signal after selecting the video output of said reproducing apparatus for a predetermined time.

* * * * *